United States Patent [19]

Urabe

[11] 4,437,531

[45] Mar. 20, 1984

[54] ELECTRICAL POWER STEERING SYSTEM

[75] Inventor: Sumio Urabe, Shiga, Japan

[73] Assignee: Toyo Umpanki Co., Ltd., Osaka, Japan

[21] Appl. No.: 362,793

[22] Filed: Mar. 29, 1982

[30] Foreign Application Priority Data

Sep. 25, 1981 [JP] Japan .............................. 56-152407

[51] Int. Cl.³ ............................................ B62D 5/04
[52] U.S. Cl. .............................. 180/79.1; 74/388 PS; 318/2
[58] Field of Search ...................... 180/79.1, 141, 142; 318/2, 628; 74/388 PS, 388 R

[56] References Cited

U.S. PATENT DOCUMENTS

| 2,587,377 | 2/1952 | Penrose | 318/2 |
| 2,754,465 | 7/1956 | Brier | 180/79.1 X |
| 3,983,953 | 10/1976 | Bayle | 180/79.1 |
| 4,223,254 | 9/1980 | Adams | 318/2 |

FOREIGN PATENT DOCUMENTS 1183838  2/1959  France ............................ 74/388 R Primary Examiner—Joseph F. Peters, Jr.
Assistant Examiner—Mitchell J. Hill
Attorney, Agent, or Firm—Sughrue, Mion, Zinn, Macpeak & Seas

[57] ABSTRACT

A first shaft coupled to a steering wheel at one end is coupled for at least limited relative rotation at its other end to a second shaft via a threading engagement so that relative rotation of the first and second shafts will also result in relative axial movement. A detector detects the axial movement of either the first shaft or a linearly movable member attached thereto, and a servomotor rotates the second shaft in a direction to return the first and second shafts to their neutral relative position.

11 Claims, 7 Drawing Figures

ELECTRICAL POWER STEERING SYSTEM

BACKGROUND OF THE INVENTION

This invention relates to an electrical power steering system.

In an electrical power steering system, the angle of displacement of a first shaft connected to a steering wheel with respect to a second shaft mechanically coupled to wheels to be steered is detected, and a servomotor or the like rotates the second shaft according to the angle of displacement thus detected. In general, the first and second shafts are arranged in one line, and a displacement angle detector is disposed between the two shafts. Since the displacement angle detector operates to detect the angles of relative rotation of the two shafts, it is absolutely necessary to provide lead wires for the detector in order to forward the detection signal to the control circuit of the servomotor. The detector is fixedly mounted on the first shaft and/or the second shaft. Since the displacement angle detector makes a circular motion as the shaft is turned, the lead wires must be sufficiently long, and it is essential that the lead wires are arranged so that they may not obstruct the rotation of the shaft.

SUMMARY OF THE INVENTION

An object of this invention is to provide an electrical power steering system in which the displacement angle detector can be fixedly mounted irrespective of the rotation of the shaft, and accordingly the above-described requirements in arrangement of the lead wires are eliminated.

Briefly, this is achieved according to the present invention by providing a coupling means wherein the first and second shafts are threadingly coupled to one another so that relative rotation between the two shafts will also result in axial relative movement. A detection device can detect the linear axial movement of the first shaft or a linearly movable member attached thereto, and a servomotor rotates the second shaft in a direction such that the first and second shafts are returned to their neutral relative position. In a first embodiment, the linearly movable member is an annular shield member secured at the junction of the first shaft and a threaded member attached thereto, and the detection device comprises first and second detectors on opposite sides of the shield member each of which detects the linear movement of the shield. By comparing the output signals from the two detectors, a control signal corresponding to twice the quantity of linear movement can be obtained to thereby achieve highly accurate control. In a second embodiment, a linearly movable member comprises a disk which is rotatably mounted but axially fixed to the first shaft and is prevented from rotation by a guide member, an extension from the disk being coupled to the wiper of a potentiometer which is used to generate the detection signal.

A further feature of the invention resides in the provision of limiting members for limiting the relative axial and/or relative rotational movement of the first and second shafts to thereby directly couple the first and second shafts when their relative rotational angle exceeds a predetermined value.

BRIEF DESCRIPTION OF THE DRAWINGS

Embodiments of this invention will be described with reference to the accompanying drawings, in which.

DETAILED DESCRIPTION OF THE INVENTION

Figure 1:
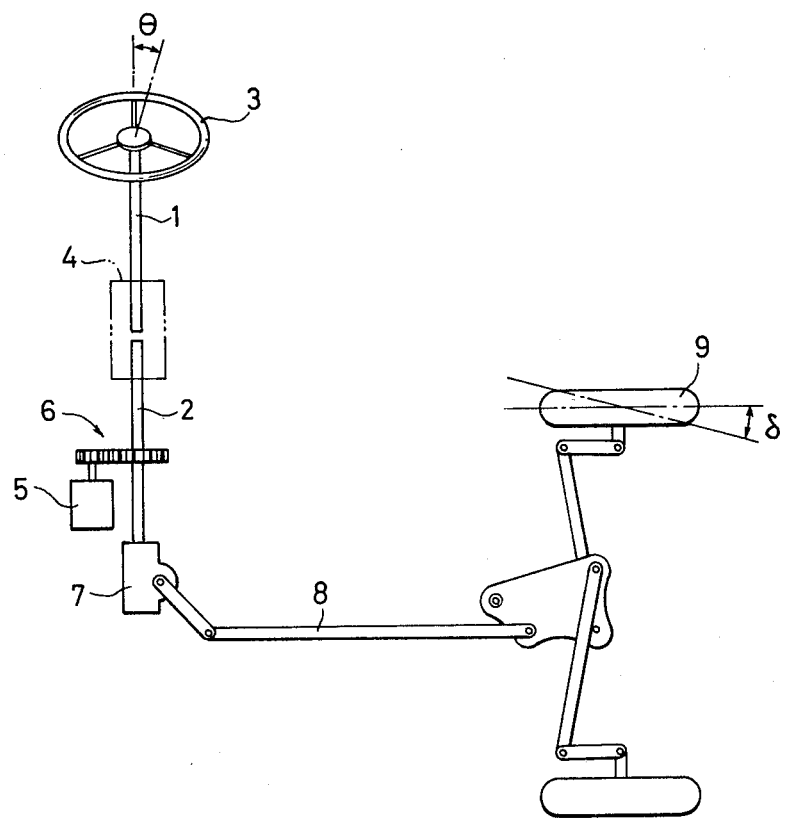
FIG. 1 is an explanatory diagram showing the entire arrangement of one example of an electrical power steering system according to this invention.

As shown in FIG. 1, a first shaft 1 whose one end is connected to a steering wheel 3 and a second shaft 2 mechanically coupled to wheels 9 to be steered are arranged in one line. A mechanism 4 for detecting the angle of displacement between the two shafts 1 and 2 is disposed between the other end of the first shaft 1 and one end of the second shaft 2. A steering servomotor 5 is controlled according to a signal outputted by the displacement angle detecting mechanism 4. The torque of the servomotor 5 is transmitted through a transmission mechanism 6, including gears, to the second shaft 2. The other end of the second shaft 2 is coupled to gears in a steering gear box 7, so that the angle of rotation of the second shaft 2 is transmitted through the steering box 7 and a drag link 8 to the drive wheels 9. When the steering wheel 3 is turned through an angle $\theta$, the direction of the wheels 9 is changed by an angle $\delta$ proportional to the angle $\theta$ by means of the above-described mechanism.

Figure 2:
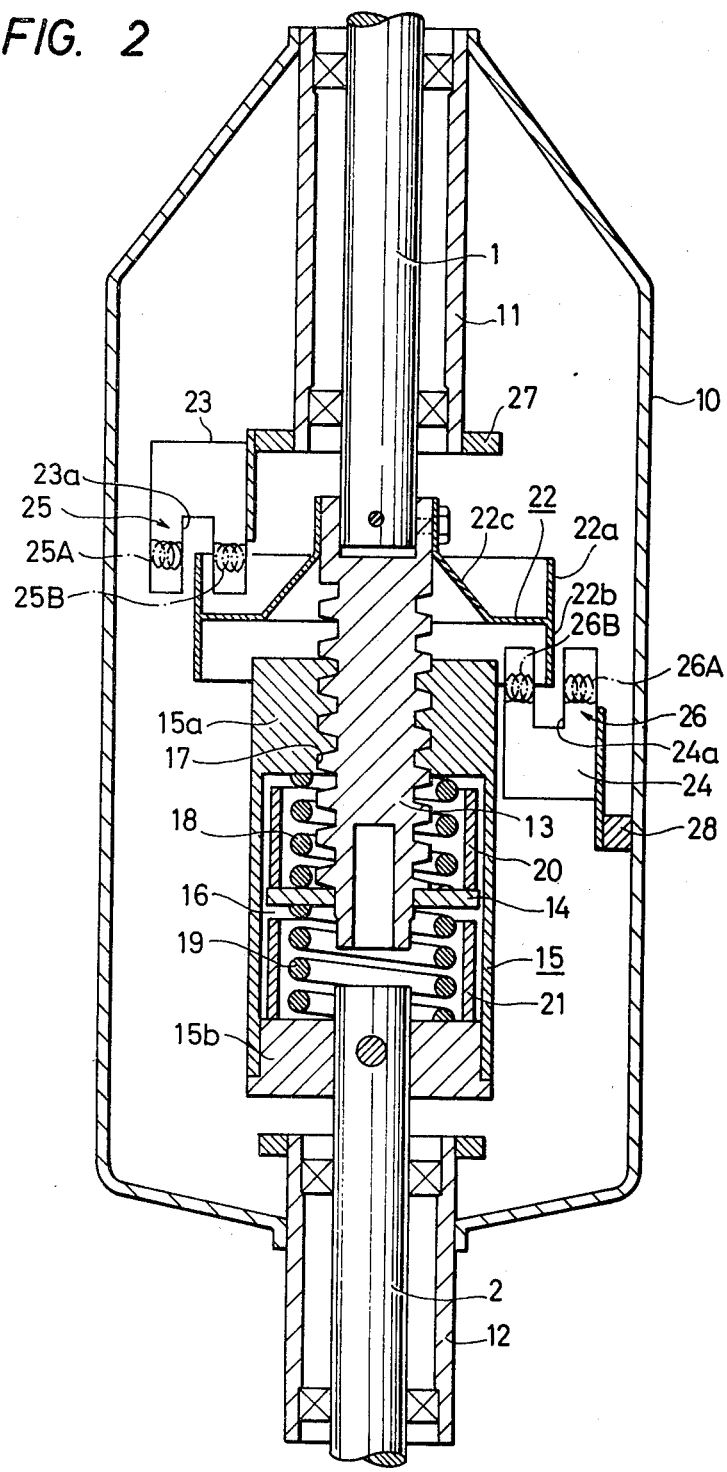
FIG. 2 is a vertical sectional view of a displacement angle detecting mechanism in FIG. 1.
Figure 3:
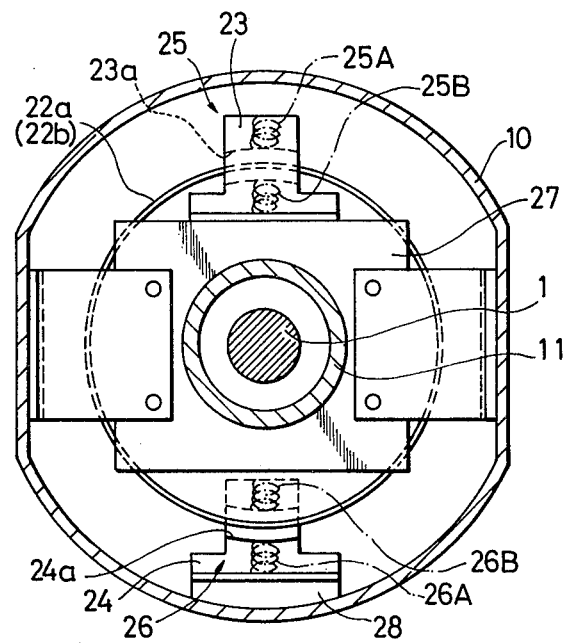
FIG. 3 is a cross sectional view of the displacement angle detecting mechanism in FIG. 2.

The displacement angle detecting mechanism 4 is illustrated in FIGS. 2 and 3 in more detail. The housing 10 of the mechanism 4 is fixedly secured to suitable parts of the vehicle. Bearings 11 and 12 are provided at both ends of the housing 10, respectively. The first shaft 1 is supported by the bearing 11 in such a manner that it is rotatable, and movable in its axial direction, and the second shaft 2 is supported by the bearing 12 in such a manner that it is rotatable but not movable in its axial direction. The end portion of the shaft 1, which is extended into the housing 10, is fixedly secured to a threaded shaft 13 which extends along the axis of the first shaft 1. A disk-shaped receiving member 14 is mounted on the end portion of the threaded shaft 13. The end portion of the second shaft 2, which is extended into the housing 10, is fixedly secured to one end wall 15b of a coupling box 15 which is in the form of a cylinder whose both ends are closed so that a closed chamber 16 is formed therein. A threaded hole 17 is formed in the other end wall 15 and the threaded shaft 13 is screwed into the threaded hole 17, with the end portion of the threaded shaft 13 extending into the chamber 16 of the coupling box 15. When the two shafts 1 and 2 are at the neutral position, the receiving member 14 is positioned at the middle level in the chamber 16.

Restoring compression springs 18 and 19 are disposed between the receiving member 14 and the end wall 15a and between the receiving member 14 and the end wall 15b, respectively. A cylindrical stopper 20 extending towards the end wall 15a is fixedly secured to the receiving member 14, and a cylindrical stopper 21 extending towards the receiving member 14 is fixedly secured to the inner surface of the end wall 15b.

A shield member 22 is mounted on the base of the threaded shaft 13. The shield member 22 is made up of a disk-shaped part 22c secured to the threaded shaft 13, and shield parts 22a and 22b which extend from the periphery of the disk-shaped part 22c in opposite directions parallel to the axis of the shafts 1 and 2. Supporting members 23 and 24 have grooves 23a and 24a into which the shield parts 22a and 22b are allowed to extend, respectively. The supporting members 23 and 24 are arranged in the housing 10. More specifically, the supporting member 23 is secured through a mounting member 27 to the bearing 11 and the housing 10, and the supporting member 24 is secured through a mounting member 27 to the housing 10. The supporting members 23 and 24 are provided with displacement angle detectors 25 and 26, respectively. The detector 25 is composed of a transmitting coil 25A and a receiving coil 25B which are provided on either side of the groove 23a. Similarly, the detector 26 is composed of a transmitting coil 26A and a receiving coil 26B which are provided on either side of the groove 24a.

As the shaft 1 is turned by the steering wheel 3, shaft 1 will rotate with respect to shaft 2, and the threaded shaft 13 secured to the shaft 1 is screwed into the box 15. Accordingly, the shaft 1 is displaced in the axial direction by a distance proportional to the angle of rotation, and at the same time the shield member 22 is displaced in the same direction. A signal having a high frequency on the order of 10 MHz is applied to the transmitting coils 25A and 26A of the detectors 25 and 26, and the radio waves transmitted by the transmitting coils 25A and 26A are received by the receiving coils 25B and 26B, respectively. As the shaft 1 is displaced, the shield parts 22a and 22b move in and out of the respective grooves 23a and 24a. Accordingly, the level of the radio wave received by one of the receiving coils is increased, but the level of the radio wave received by the other is decreased. Therefore, the amount of axial displacement of the shaft 1, and consequently the angle of displacement of the shaft 1, can be detected by a detection circuit (described later) according to the levels of the high frequency signals thus received.

When the shaft 1 is turned through more than a predetermined angle with respect to the shaft 2, the stoppers 20 and 21 are caused to abut against the end wall 15a of the box 15 and the receiving member 14, respectively, to provide a frictional force. The two shafts 1 and 2 are then coupled to each other through this frictional force, so that the torque of the shaft 1 is transmitted directly to the shaft 2. When the operator releases the steering wheel 3, i.e., no torque is exerted on the shaft 1, the shaft 1 is returned to the neutral position by the restoring springs 18 and 19.

Figure 4:
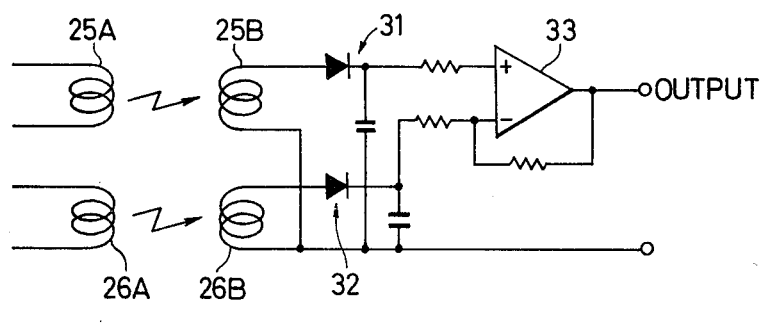
FIG. 4 is a circuit diagram showing a displacement angle detecting circuit.

FIG. 4 shows one example of the aforementioned detecting circuit. The high frequency signals received by the receiving coils 25B and 26B are detected by detectors 31 and 32, and the outputs of the detectors 31 and 32 are applied to a differential amplifier 33. Since the difference signal between the two input signals is obtained in the differential amplifier 33, the latter 33 provides an output corresponding to twice the amount of displacement of the shaft 1. This output signal is supplied to the control circuit of the servomotor 5, as a result of which the servomotor 5 turns the shaft 2 by an angle which is determined according to the angle of rotation of the shaft 1 and in a direction which is determined according to the direction of rotation of the shaft 1.

In the above-described embodiment, one pair of displacement angle detectors 25 and 26 are provided, and the difference signal between the detection signals of the detectors 25 and 26 is employed as the displacement angle detection signal. In this way, the output is twice that which is provided in the case where one detector is employed, and therefore the operation is considerably high in accuracy. Furthermore, in the above-described embodiment, a high frequency signal is applied to the transmitting coils; however, a relatively low frequency signal may be applied to the transmitting coils and mutual induction between the transmitting and receiving coils may be utilized. In this case, depending on the positions of the shield parts, the degree of coupling between the transmitting and receiving coils is varied. The above-described displacement angle detector may be replaced by any other suitable displacement detector, e.g. one which comprises a light emitting unit and a light receiving unit to detect the quantity of light which is varied by the shield member, or one which detects a distance from the shield member, or one in which, instead of the shield member, a magnet is employed so that the variation of magnetic flux from the magnet is detected by a magneto-electric conversion element. In the above-described embodiment, cylindrical stoppers are employed; however, they may be replaced by pins which are provided on the threaded shaft in such a manner that they extend radially from the threaded shaft and are inserted into elongated holes which are cut in the cylindrical wall of the box surrounding the shaft to permit free circumferential but limited axial movement. The circumferential movement may also be limited if the pitch of the threads is to be such that less than one full turn of relative rotation is to be permitted. Instead of the threaded shaft and the threaded hole, a ball screw may be employed.

Figure 7:
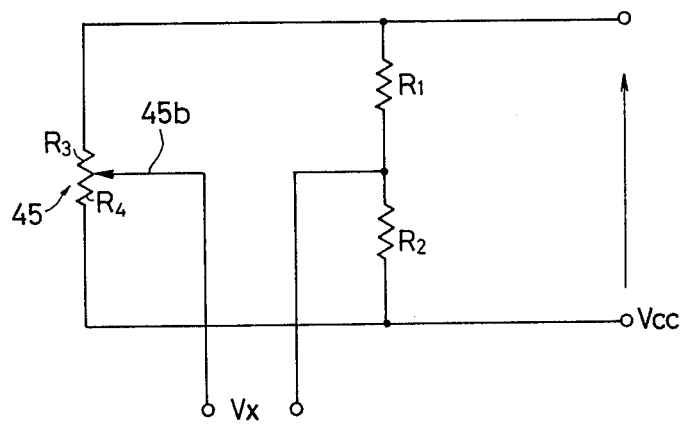
FIG. 7 is a circuit diagram showing a displacement angle detecting circuit operated in association with the mechanism of FIGS. 5 and 6.
Figure 5:
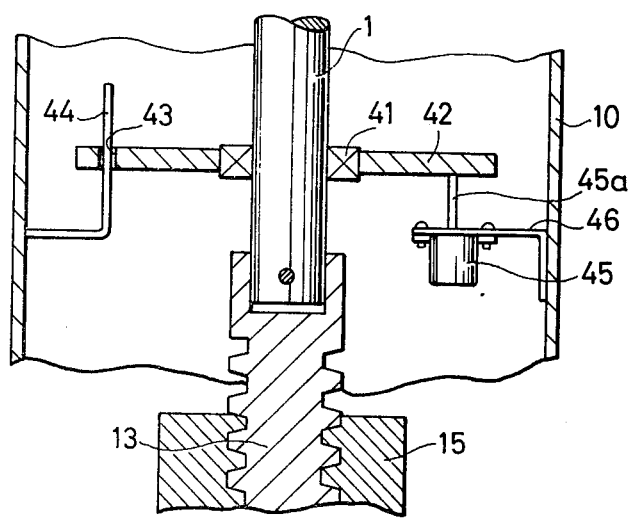
FIG. 5 is a vertical sectional view showing a part of another displacement angle detecting mechanism according to the invention.
Figure 6:
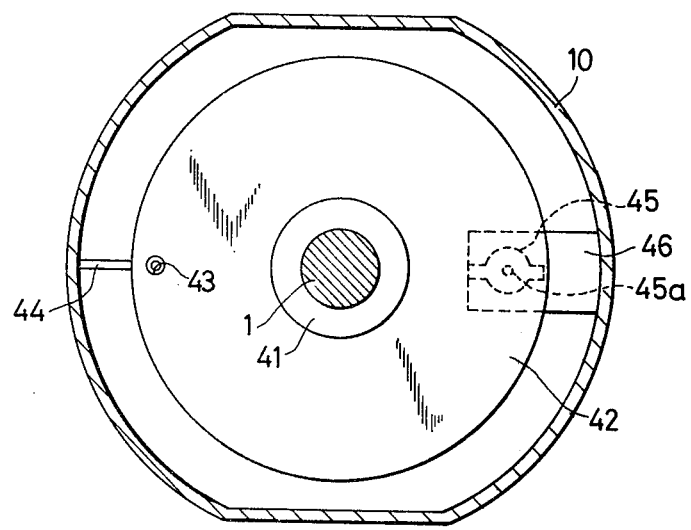
FIG. 6 is a cross sectional view of the mechanism of FIG. 5.

FIGS. 5 through 7 show a second embodiment of the invention. FIG. 5 shows only a part of the embodiment; however, it should be noted that the remaining parts are similar to those in FIG. 2. As shown in FIGS. 5 and 6, a bearing 41 is mounted on the lower end portion of a shaft 1 and is supported by an annular member 42. The bearing 41 is rotatably supported on the shaft 1, and is moved together with the shaft 1 in the axial direction thereof. A guide hole 43 is formed in the annular member 42. A slide bar 44 secured to the inner wall of the housing 10 is slidably inserted in the guide hole 43. The rotation of the annular member 42 is prevented by the slide bar 44.

In this embodiment, a potentiometer 45 is employed as the displacement angle detector. The potentiometer 45 is secured to the housing 10 through a mounting member 46. The shaft 45a of the potentiometer 45, to which a wiper 45b is connected, is fixedly secured to the annular member 42. The potentiometer 45 forms a part of a bridge circuit, as shown in FIG. 7. It is assumed that the resistance of the potentiometer 45 is electrically divided into resistances R3 and R4 by the wiper 45b, which are two resistances in the bridge circuit, and that the bridge circuit has two other resistances R1 and R2.

The bridge circuit is so adjusted that R1/R2=R3/R4 when the shaft 1 is at the neutral position, and a predetermined voltage Vcc is applied to the bridge circuit.

With this arrangement, the output Vx of the bridge circuit is:

$$Vx = \frac{R1\,R4 - R2\,R3}{(R1 + R2)(R3 + R4)} Vcc$$

As the shaft 1 is turned by the handle 3, the shaft 1 is displaced in the axial direction while the shaft 45a of the potentiometer 45 is also moved in the same direction, as a result of which the resistances R3 and R4 are changed, and accordingly the output Vx of the bridge circuit is also changed. When the shaft 1 is at the neutral position, the output Vx is zero (0). When the shaft 1 is turned clockwise or counterclockwise, then the output Vx becomes positive or negative according to the direction of rotation of the shaft, and the absolute value of the output Vx represents the angle of displacement. The servomotor 5 is controlled by the output Vx; that is, the servomotor 5 turns the second shaft 2 so that the output Vx becomes zero (0).

As was described in detail above, in the electrical power steering system according to the invention, the first shaft connected to the steering wheel is so designed that it is displaced in the axial direction when turned. The amount of displacement in the axial direction represents an angle of displacement relative to the second shaft operatively coupled to the wheels to be steered. All that is required for the displacement angle detectors is to detect the amount of displacement in the axial direction of the first shaft. Therefore, the displacement angle detectors may be fixedly secured to the housing or other parts. The displacement angle detectors can thus be maintained fixed irrespective of the rotation of the shaft. Therefore, the lead wires for transmitting the detection outputs from the displacement angle detectors can be fixedly set at suitable positions in advance. Accordingly, the lead wires will never become an obstruction, and the displacement angle detecting mechanism can be made compact.

WHAT IS CLAIMED IS:

1. An electrical power steering system comprising:
   a steering wheel;
   a first shaft having an axis and coupled to said steering wheel for rotation therewith;
   a second shaft axially aligned with said first shaft;
   coupling means for coupling said first and second shafts for at least limited relative rotation from a neutral position with respect to one another;
   linearly movable means for moving linearly in response to relative rotation of said first and second shafts from said neutral position;
   detection means for detecting the amount of linear movement of said linearly movable means and providing a detection signal proportional to the amount of said linear movement; and
   servo means responsive to said detection signal for rotating said second shaft until said neutral position is obtained.

2. A system as claimed in claim 1, wherein said coupling means comprises a first threaded member secured to said first shaft for rotation therewith and a second threaded member threadingly engaging said first threaded member and secured to said second shaft for rotation therewith.

3. A system as claimed in claim 2, wherein said first and second threaded members are axially fixed to said first and second shafts, respectively, whereby said first shaft moves axially with respect to said second shaft upon relative rotation between said first and second shafts.

4. A system as claimed in claims 2 or 3, wherein said linearly movable means is operatively coupled to said first shaft.

5. A system as claimed in claim 1, wherein said detection means comprises a first detector for providing a first signal which increases when said linearly movable means moves in a first direction and decreases when said linearly movable means moves in a second direction opposite said first direction, a second detector for providing a second signal which increases when said linearly movable means moves in said second direction and decreases when said linearly movable means moves in said first direction, and comparison means for comparing said first and second signals.

6. A system as claimed in claims 2 or 3, wherein said linearly movable means is rotatably mounted but axially fixed relative to said first shaft, said system further including guide means for engaging said linearly movable means and preventing rotation thereof while said first shaft rotates.

7. A system as claimed in claim 2 or 3, wherein said coupling means includes means for limiting the relative rotational movement of said first and second shafts.

8. A system as claimed in claim 2 or 3, wherein one of said first and second threaded members includes an interior cavity into which the other of said first and second threaded members extends, said interior cavity having first and second axial end walls, said coupling means further comprising a receiving member secured to an end of said other threaded member within said cavity.

9. A system as claimed in claim 8, wherein said coupling means further comprises limiting means disposed between said receiving member and said first end wall and between said receiving member and said second end wall respectively for limiting the range of axial movement of said receiving member within said cavity, whereby said first and second shafts become directly coupled when their relative rotation reaches a predetermined value.

10. A system as claimed in claim 8, wherein said receiving member is disposed at a first position within said cavity when said first and second shafts are at their neutral relative position, said coupling means further comprising biasing means for urging said receiving member towards said first position.

11. A system as claimed in claim 9 wherein said receiving member is disposed at a first position within said cavity when said first and second shafts are at their neutral position, said coupling means further comprising biasing means for urging said receiving member towards said first position.

* * * * *